No. 806,475. PATENTED DEC. 5, 1905.
W. A. KÖNEMAN.
GRILL.
APPLICATION FILED NOV. 30, 1904.
2 SHEETS—SHEET 1.
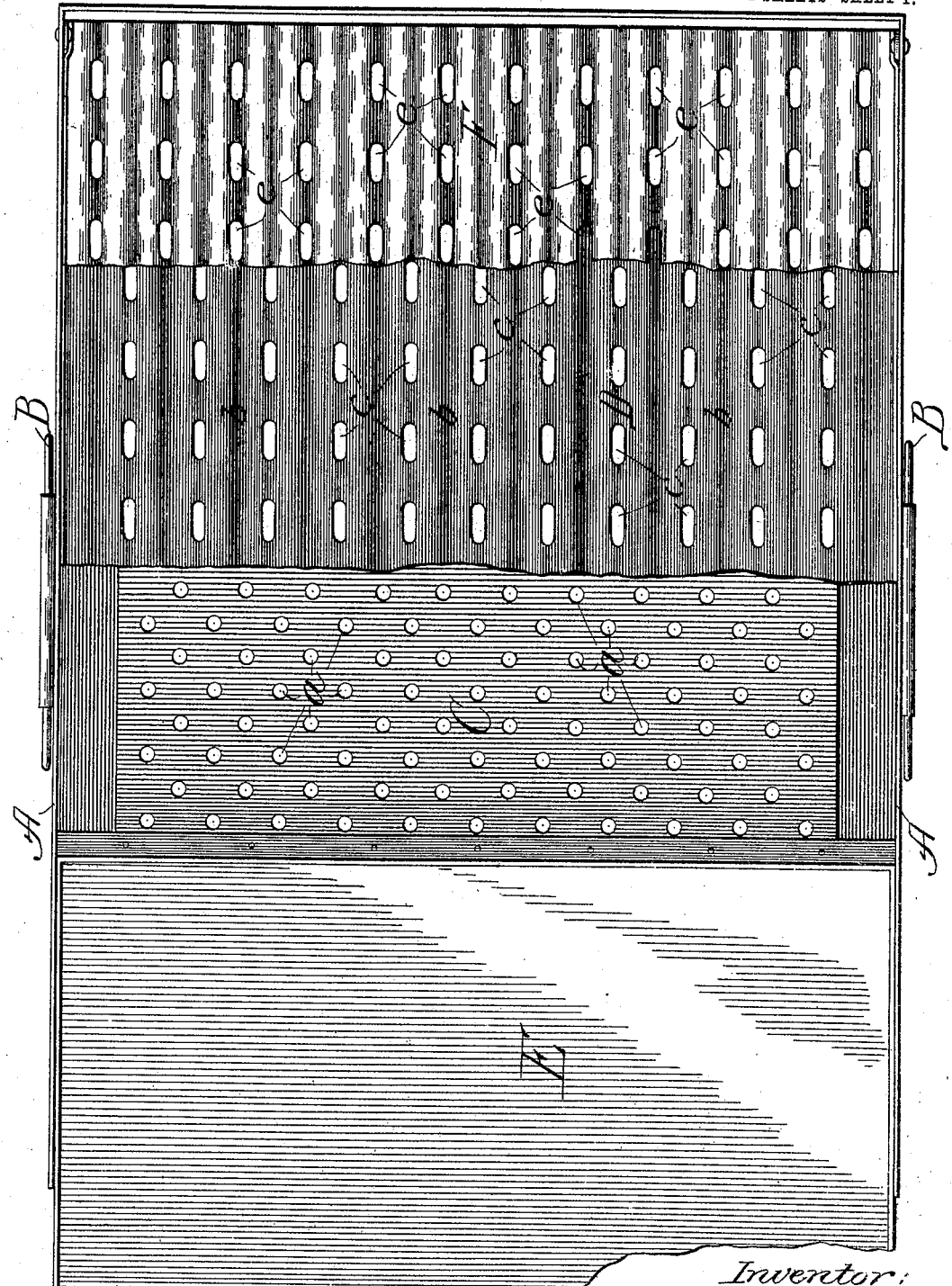

No. 806,475. PATENTED DEC. 5, 1905.
W. A. KÖNEMAN.
GRILL.
APPLICATION FILED NOV. 30, 1904.
2 SHEETS—SHEET 2.
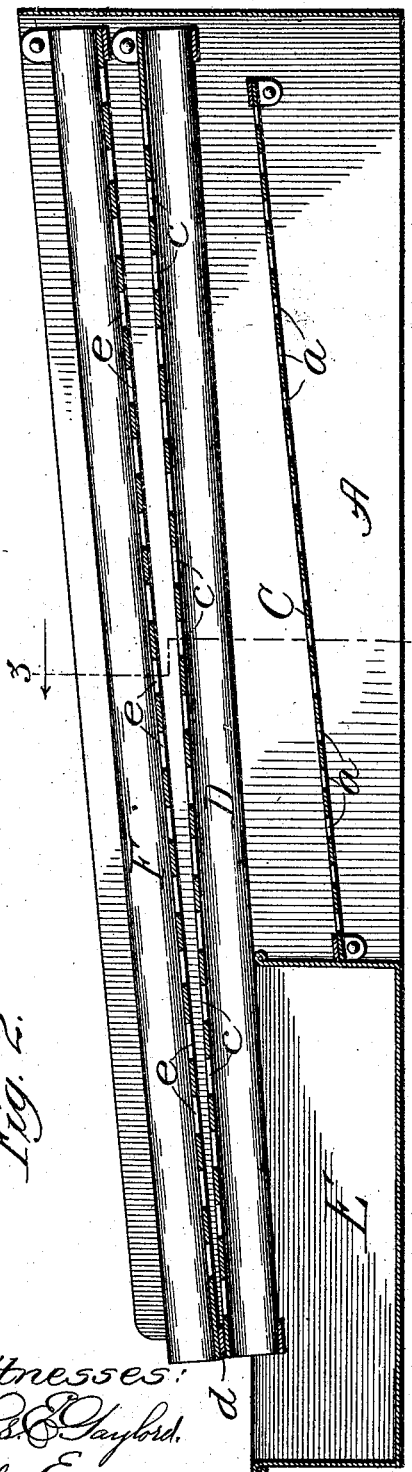
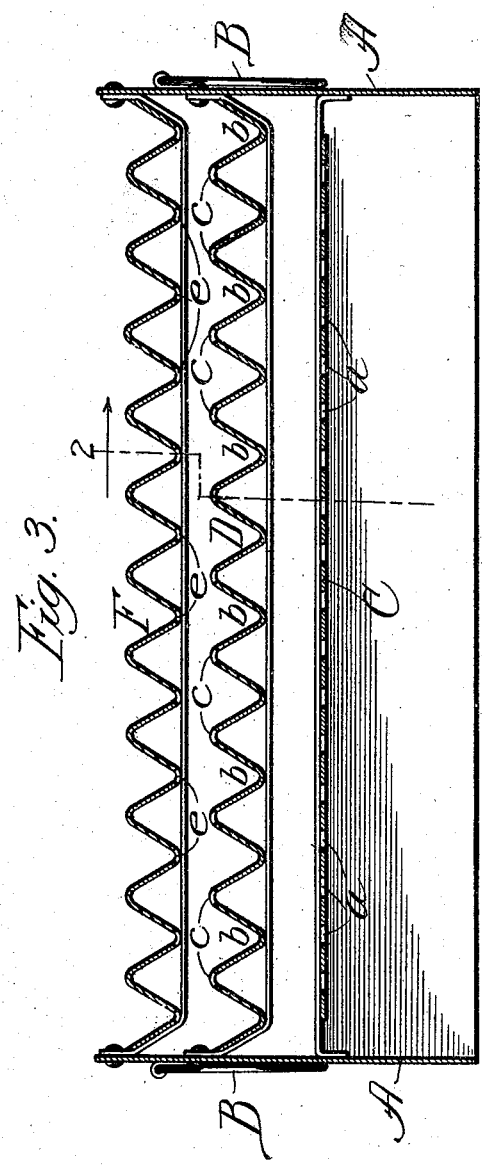
Witnesses:
Inventor:
William A. Köneman,

UNITED STATES PATENT OFFICE.

WILLIAM A. KÖNEMAN, OF CHICAGO, ILLINOIS.

GRILL.

No. 806,475.  Specification of Letters Patent.  Patented Dec. 5, 1905.

Application filed November 30, 1904. Serial No. 234,934.

*To all whom it may concern:*

Be it known that I, WILLIAM A. KÖNEMAN, a citizen of the United States, residing at Chicago, in the county of Cook and State of Illinois, have invented a new and useful Improvement in Grills, of which the following is a specification.

The primary object of my invention is to provide a grill or broiling utensil of any suitable construction with means for mixing water-vapor or steam with the hot products of combustion employed in cooking the food on the grill.

I have found that by commingling steam with the hot products of combustion used in broiling meat sufficient heat is abstracted from the latter to prevent scorching the meat and also volatilization and carbonization of the fats and juices exuding therefrom and also that the moistening effect of the steam on the dry heat from the burning fuel directed against the meat renders it very tender and causes it to retain the juices during cooking without being contaminated with any taste or flavor from the products of combustion.

I have embodied the foregoing improvement as the more important feature of my invention in a novel construction of grill, among the objects of which are to effect even distribution of the heat to the food being broiled and enable the broiling operation to be performed without permitting the grease or drippings to come into contact either with the flame or the surface of the stove used for cooking, to adapt the steam employed to exert the effect of preventing burning on the grill itself of the grease or drippings from meat being broiled, which burning occasions smoke and disagreeable odor, and to render all parts of the utensil conveniently accessible for cleaning.

A broiler embodying all of the features of my invention is illustrated in the accompanying drawings, in which—

Figure 1 is a broken plan view; Fig. 2, a longitudinal vertical section taken on the irregular line 2 of Fig. 2 and viewed in the direction of the arrow, and Fig. 3 a transverse vertical section taken on the irregular line 3 on Fig. 2 and viewed in the direction of the arrow.

A denotes the bottomless box-like frame of the utensil, formed, preferably, of sheet metal and which may be provided with handles B on its sides, as shown. A diaphragm C, fitting in the frame some distance above its base, is rigidly fastened in place and contains numerous perforations $a$. The diaphragm C is the heat-distributing element of the device and is shown as inclining lengthwise of the frame for use in that position when the broiling-flame is applied, as it may be sometimes, under the diaphragm at its lower end, when the gradually-increasing height of the space underneath the diaphragm will tend to distribute the heat more uniformly over its under surface and through the perforations, though if the flame is applied under the central part of the diaphragm the heat distribution will be uniform if the diaphragm be horizontal, as it may be.

Above the diaphragm C is supported, preferably by hinging to the sides of the frame near one end, a diaphragm D, extending to a receptacle E, supported between the frame sides. This diaphragm is formed with a regular transverse series of deep corrugations, affording channels or runs $b$ for the drippings, which flow into the receptacle E, and apertures $c$, forming outlets for the heating gases, are provided in the upper ridges between channels. Above the diaphragm D is supported, preferably by being hinged at one end between the sides of the frame, a similar corrugated diaphragm F, carrying at its free end a cross-strip $d$ to support said end on the corresponding end portion of the diaphragm D. The corrugations in the uppermost diaphragm are provided with apertures $e$ in their lower apexes or bases, which register with the imperforate bases of the channels $b$ in the diaphragm D. Both of the diaphragms D and F are represented as slanting correspondingly in a downward direction toward the receptacle E; but they may be horizontal, or the uppermost one only may be horizontal.

The receptacle E is provided for holding water and to catch the drippings from the runs $b$.

Meat to be grilled is placed on the diaphragm F, and the utensil is supported over the cooking flame or fire. (Not shown.) The heat is distributed by the perforated diaphragm C with desirable uniformity, because of its numerously-perforated character, and passes through the diaphragm D at its openings $c$ and through the openings $e$ in the diaphragm F to effect the broiling action on the meat. The drippings enter the channels $b$ through the openings $e$ and flow in the channels into the receptacle E, being prevented by the construction from running or dropping into the heating medium or upon the stove. The heat vaporizes the water in the receptacle E and the vapors from the water commingle with the hot products of combustion which pass through the diaphragm C and become superheated steam, exerting their heat-obstructing effect upon the products of combustion, with the aforesaid result of preventing the meat from being scorched and the fats and juices exuding therefrom from being volatilized and carbonized, the steam also moistening the heat, with the effects on the meat of rendering it very tender, causing it to retain its juices and preventing it from tasting of the products of combustion, and with the further effect of preventing the drippings from adhering to the surfaces of the utensil and burning.

While the utensil thus described is a grill, it may be used for cooking other food than meat, as for toasting bread, with the advantage of the steam action of rendering the toast soft and preventing it from being burned.

The hinged condition of the corrugated diaphragms adapts them to be raised on their hinges for convenience of access to the parts of the utensil for cleaning it.

The details of construction shown and described may be modified in various particulars without departure from my invention, which is not, therefore, intended to be limited thereto except in those of the appended claims wherein such details are specifically set forth.

What I claim as new, and desire to secure by Letters Patent, is—

1. In a grill, the combination with a frame, of a perforated lower heat-distributing diaphragm, a perforated upper diaphragm, and means for commingling steam with the hot products of combustion from the cooking-fire in their course through said lower diaphragm to the food imposed upon said upper diaphragm to be cooked, substantially as and for the purpose set forth.

2. In a grill, the combination with a frame, of a perforated lower heat-distributing diaphragm, a perforated upper diaphragm, and a water-receptacle supported on said frame to be heated in the cooking operation for vaporizing the water in said receptacle and supplying steam to the hot products of combustion from the cooking-fire in their course through said lower diaphragm to the food imposed upon said upper diaphragm to be cooked, substantially as and for the purpose set forth.

3. In a grill, the combination with a frame, of a perforated heat-distributing lower diaphragm, a corrugated diaphragm above said lower diaphragm provided with apertures and forming channels, and an upper diaphragm provided with drip-apertures opening to said channels.

4. In a grill, the combination with a frame, of a perforated heat-distributing lower diaphragm, a corrugated diaphragm above said lower diaphragm, forming channels and provided with apertures above the base portions of the channels, and an upper corrugated diaphragm provided with drip-apertures out of registration with the apertures in the lower corrugated diaphragm.

5. In a grill, the combination with a frame, of a perforated heat-distributing lower diaphragm, a corrugated diaphragm above said lower diaphragm, forming channels and provided with apertures in the upper ridges between channels, and an upper corrugated diaphragm provided with drip-apertures in the base portions of its depressions registering with the imperforate base portions of the channels in one corrugated diaphragm below it.

6. In a grill, the combination with a frame, of a perforated heat-distributing lower diaphragm, a corrugated diaphragm above said lower diaphragm provided with apertures and forming channels, an upper diaphragm provided with drip-apertures opening to said channels, and a water-vaporizing receptacle supported on said frame, substantially as and for the purpose set forth.

7. In a grill, the combination with a frame, of a perforated heat-distributing lower diaphragm, a corrugated diaphragm above said lower diaphragm, forming channels and provided with apertures in the upper ridges between channels, an upper corrugated diaphragm provided with drip-apertures in the base portions of its depressions registering with the base portions of the channels in the corrugated diaphragm below it, and a water-vaporizing receptacle supported in said frame, substantially as and for the purpose set forth.

8. In a grill, the combination with a frame, of a perforated heat-distributing lower diaphragm, a corrugated diaphragm above said lower diaphragm, forming channels and provided with apertures above the base portions of the channels, a receptacle on the frame at the discharge end of said corrugated diaphragm, and an upper corrugated diaphragm provided with drip-apertures out of registration with the apertures in the lower corrugated diaphragm.

9. In a grill, the combination with a frame, of a perforated heat-distributing lower diaphragm, a corrugated diaphragm forming channels and hinged at one end to extend over said lower diaphragm and provided with apertures above the base portions of the channels, and an upper corrugated diaphragm hinged at one end to extend over said first-named corrugated diaphragm and provided with drip-apertures out of registration with the apertures in the lower corrugated diaphragm.

10. In a grill, the combination with a frame, of a perforated heat-distributing lower diaphragm, a corrugated diaphragm, forming channels and hinged at one end to extend over said lower diaphragm and provided with apertures in the upper ridges between channels, a water-holding receptacle on the frame at the discharge end of said corrugated diaphragm, and an upper corrugated diaphragm hinged at one end to extend over said first-named corrugated diaphragm and provided with drip-apertures registering with the base portions of the channels in the corrugated diaphragm below it.

WILLIAM A. KÖNEMAN.

In presence of—
M. S. MACKENZIE,
J. H. LANDES.